United States Patent Office 3,335,200
Patented Aug. 8, 1967

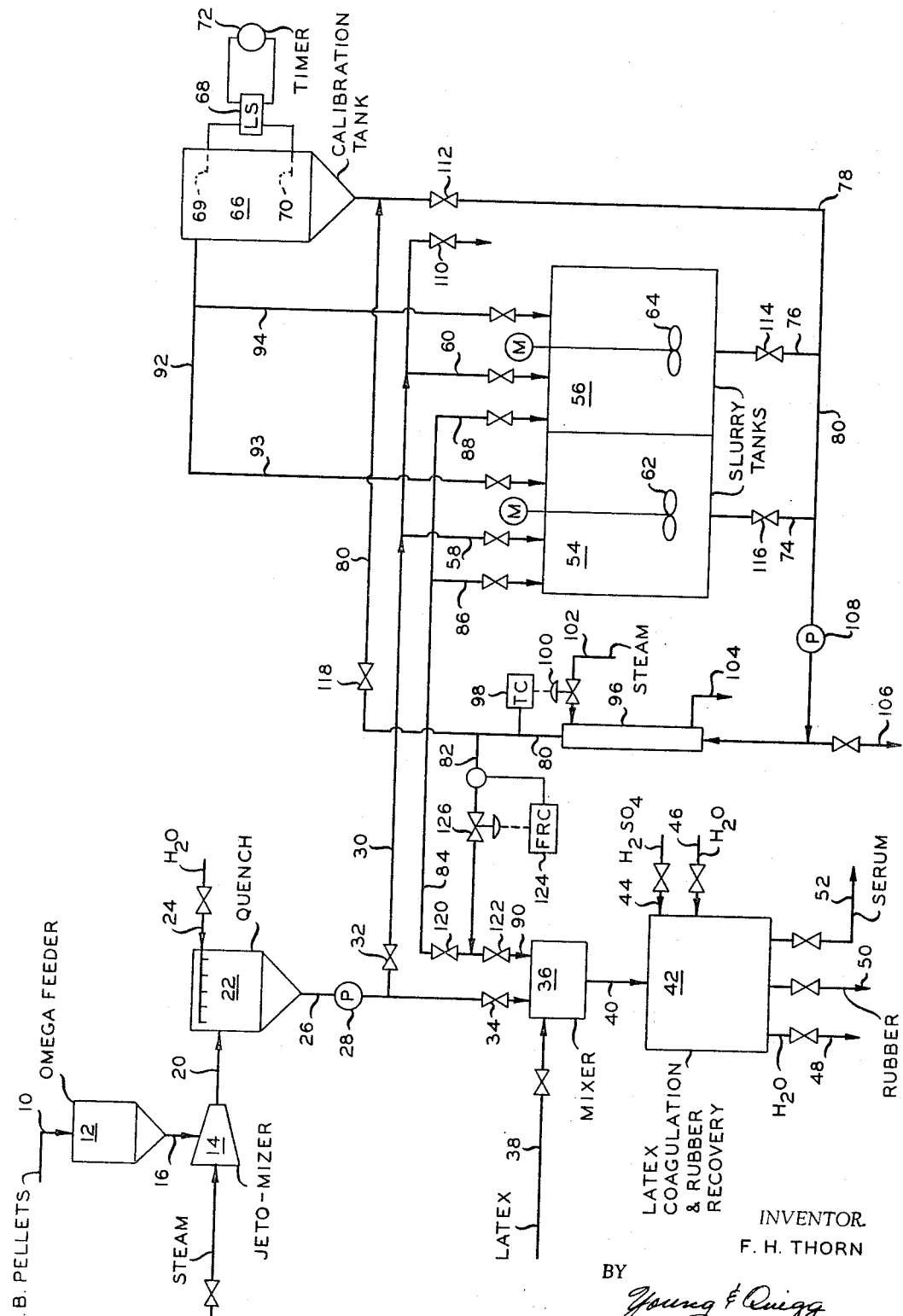

3,335,200
APPARATUS AND PROCESS FOR THE COAGULATION OF RUBBER LATEX AND CARBON BLACK
Frank H. Thorn, Borger, Tex., assignor to Phillips Petroleum Company, a corporation of Delaware
Filed Dec. 4, 1963, Ser. No. 327,926
7 Claims. (Cl. 260—746)

This invention relates to a process and apparatus for preparing carbex, i.e., latex coagulated with carbon black.

In the production of carbex, carbon black pellets are continuously disintegrated and slurried with water to provide a uniform concentration of carbon black in the slurry. After producing the desired slurry, it is fed directly into a mixing zone to which also is fed the latex to be coagulated. The mixture of latex and carbon black of predetermined proportions is then fed to a coagulation zone where the coagulation of the latex is effected. At the beginning of the preparation of carbex, the pellets are first disintegrated with steam in a Jetomizer, slurried with water, and the slurry is passed to the sewer until the lines are flushed of water and the concentration of carbon black in the slurry has reached a predetermined concentration. Then the slurry of carbon black is fed continuously into the latex-mixing zone, followed by coagulation of the latex and the resulting rubber, containing carbon black, is recovered. When the production of carbex is interrupted by shutting down the process for any reason, the slurry of carbon black in the lines is flushed out with water to the sewer.

This invention is concerned with a process and apparatus which utilizes the carbon black normally flushed to the sewer, in a unique and advantageous manner, so as to conserve the carbon black and facilitate the economy of the process.

Accordingly, it is an object of the invention to provide a process and apparatus of improved economy for the preparation of carbex. Another object is to conserve carbon black in the preparation of carbex. Other objects of the invention will become apparent on consideration of the accompanying disclosure.

A broad aspect of the invention comprises passing all carbon black slurry that is normally flushed to the sewer into a slurry storage tank both at the start-up and termination of the production of carbex. The concentration of carbon black in the slurry in the storage tank is determined and pumping of the slurry is effected thru a flow rate controller in order to determine the pumping rate thru the flow controller. Thereafter, the slurry is pumped at a known rate of flow of carbon black in the slurry into the latex-carbon black mixing zone or chamber simultaneously with controlled flow of latex thereto, thereby utilizing the normally wasted carbon black in the preparation of the product rubber.

The invention is best understood by reference to the accompanying schematic drawing which is a flow diagram of a specific embodiment of the invention.

Referring to the drawing, carbon black pellets are fed thru line 10 to a suitable feeder 12, which may be an Omega feeder, capable of delivering a uniform weight of pellets per unit of time to a Jetomizer 14 thru line 16. Steam is injected thru line 18 into Jetomizer 14 so as to disintegrate the pellets and deliver the steam-carbon black mixture thru line 20 into quench tank 22 where the mixture is quenched with water introduced thru line 24. The slurry formed in quench tank 22 is brought to uniformity in a period of several minutes by accurately feeding carbon black at a uniform rate into Jetomizer 14 and water and steam at controlled and predetermined rates thru lines 18 and 24, respectively.

During the period in which the effluent slurry from tank 22 passing thru line 26 and pump 28 into line 30 is brought to uniformity, i.e., a uniform concentration of carbon black in the slurry, the valve 32 is open and valve 34 is closed so that the non-uniform slurry does not pass into mixer 36. When the slurry becomes uniform, same is passed into mixer 36 while simultaneously feeding latex thru line 38 into the mixer at a predetermined rate to provide the proper mixture of carbon black and latex. The effluent mixture from tank 36 is passed thru line 40 into coagulation tank 42 where coagulation is effected by passing a suitable coagulant, such as $H_2SO_4$, thru line 44, and water, as needed, thru line 46. Water, rubber, and serum are recovered from vessel 42 thru lines 48, 50, and 52, respectively.

A pair of slurry storage tanks 54 and 56 are provided for recovery of carbon black slurry of non-uniform composition prepared during start-up of the slurry-forming step and, also, the slurry remaining in lines 26 and 30 and the bottom of tank 22 at shutdown when water is pumped into quench tank 22 after termination of the feeding of carbon black thereto so that pump 28 flushes the carbon black slurry in lines 26 and 30 into either tank 54 or 56 thru lines 58 and 60, respectively. Tanks 54 and 56 are provided with one or more stirrers each, 62 and 64, the operation of which maintains a uniform concentration of carbon black in the tank slurry.

Connected with slurry tanks 54 and 56 is a calibration tank 66 which is provided with liquid level apparatus including liquid level switch 68 and probes 69 and 70 positioned at selected levels with a known volume of liquid in tank 66 between said levels. LS 68 is operatively connected with a timer 72 so that the timer is started when LS 68 is turned on and the liquid level in tank 66 drops to the probe 69. When the liquid level reaches probe 70, timer 72 is shut off by operation of LS 68.

Connecting conduits 74, 76, 78, 80, 82, 84, 86 and 88 provide for circulation of slurry between tanks 54 and 56 and tank 66. Conduit 90 leads from the circulation system thru conduit 82 into mixer 36. Conduit 92 and conduits 93 and 94 provide for overflow of slurry from calibration tank 66 into the selected slurry tank (either tank 54 or 56).

Slurry being passed thru line 80 passes thru steam heat exchanger 96 in line 80 to provide the proper temperature for the slurry being passed into mixer 36. The temperature of the slurry is controlled by temperature controller 98 and motor valve 100 in steam line 102. Effluent steam is vented thru line 104. Slurry may be disposed at any time thru relief line 106. Pump 108 in line 80 provides impetus for the required circulation of the slurry thru the conduit system. After flushing the major portion of the slurry from lines 26 and 30 thru either line 58 or 60 into one of the slurry tanks, it is preferable to pass fluishing water to the sewer thru valve 110 in line 30 downstream of the slurry tanks.

The operation of the process and system is best illustrated by reference to the drawing. Assuming that tank 54 is substantially filled with slurry and stirrer 62 is in operation to maintain a uniform concentration of carbon black in the slurry, in order to start up the process, slurry is pumped by pump 108 from tank 54 thru lines 74 and 80 into tank 66 with valves 112, 114, 120 and 122 closed and valves 116 and 118 open. Pumping is continued until the level of slurry in tank 66 is above probe 69 and, usually, until slurry is overflowed thru lines 92 and 93 into tank 54. During this pumping, valve 120 may be open sufficiently to allow some slurry to pass thru lines 82, 84 and 86 (or 88) so as to keep the orifice in flow controller 124 open or unobstructed. This flow controller operates motor valve 126 to meter the flow of carbon black slurry into mixer 36 at the proper time.

By injecting the slurry into the bottom of tank 66 a stirrer in this tank is eliminated. However, the slurry may be introduced thru the top of the tank if a stirrer is provided.

When tank 66 is filled to the desired level above probe 69, valve 116 is closed and valves 112 and 120 are open so that operation of pump 108 passes slurry from tank 66 thru lines 78, 80, 82, 84 and 86 into tank 54. When the level in tank 66 reaches probe 69, LS 68 starts timer 72 and stops this timer when the liquid level reaches probe 70 thereby providing means for calibrating or setting flow controller 124. This operation places the slurry of known concentration of carbon black back in tank 54 and provides a known flow rate thru controller 124. It might be noted that calibration of controller 124 is necessary on each start-up because of the nature of the slurry being pumped and the possible deposition of carbon black around the controller orifice which changes the pressure drop thru the same and causes some variation in the flow thru the controller which has to be ascertained on each operation.

In starting up the process of preparing carbex, slurry is now pumped from tank 54 thru lines 80, 82 and 90 into mixer 36, it being necessary that valves 116 and 122 are open while valve 120 is closed. Simultaneously with the pumping of slurry into mixer 36 at known rate and concentration, latex is pumped thru line 38 at a predetermined rate coordinated with the rate of flow of carbon black slurry so as to provide the desired concentrations of these constituents in mixer 36. The other steps downstream of mixer 36 are performed as heretofore described, this being conventional operation in the manufacture of carbex and needing no further discussion herein.

The supplying of carbon black to mixer 36 from storage tank 54 provides adequate time for the production of a uniform stream of carbon black slurry in line 30 by start-up of the apparatus elements upstream of line 30. The non-uniform slurry prepared during the initial phase of the start-up is passed through lines 30 and 60 into tank 56 while tank 54 is being emptied as heretofore described. At any time that uniform composition is arrived at in lines 26 and 30, flow or pumping of slurry from tank 54 into mixer 36 may be terminated and valve 34 may be opened while valve 32 is closed so as to feed the uniform slurry from lines 26 and 30 into the mixer and institute normal on-stream operation for continuous production of carbex. However, it is preferred practice to pump all or most of the slurry from tank 54 during start-up.

Thus it can be seen that the process and apparatus arrangement of the invention saves the normally wasted slurry produced in lines 26 and 30 prior to the obtaining of uniformity of carbon black concentration therein and also the slurry remaining in the lines at shutdown which must be flushed out to prevent deposition of carbon black. Both of these heretofore wasted volumes of slurry and carbon black are recovered in either tank 54 or 56 and the recovered slurry is made use of in starting up the process while the preparation of uniform slurry upstream of the mixer and upstream of line 30 is brought under control.

To further illustrate the invention, when operating at feed rates of about 3330 lbs./hr. of carbon black (7760 gal./hr. of slurry) and about 2300 gal./hr. of latex (18 weight percent rubber) to produce about 4440 lbs./hr., off-concentration slurry made at start-up and slurry flushed from the slurry lines at shutdown was passed to tank 54 for several shutdowns and start-ups until tank 54 contained enough slurry for 1 to 2 hours of feeding time. The concentration of slurry in tank 54 was ascertained and then pumped into tank 66 until overflow thru lines 92 and 93 was effected. The slurry in tank 66 was then pumped by pump 108 back into tank 54 thru lines 78, 80, 82, 84 and 86 by proper operation of the valves in the system so as to calibrate flow rate controller 124.

Start-up was then initiated by pumping from tank 54 thru lines 74, 80, 82 and 90 at the metered rate (about 3330 lbs./hr. of black) into mixer 36 and simultaneously feeding latex at a coordinated rate of 2300 gal./hr. into the mixer. The effluent mix from mixer 36 was fed to coagulation chamber 42 and 11,000 lbs./hr. of solids were recovered from tank 42. After about one hour of feeding from tank 54 to mixer 36, start-up of the slurry-forming step in Jetomizer 14 and quench tank 22 was initiated and continued for about 10 minutes until the effluent slurry in lines 26 and 30 was of uniform composition. The pumping of slurry from tank 54 was then terminated and valve 32 was closed and valve 34 was opened so that slurry from lines 26 and 30 was passed into mixer 36.

During the ten minutes of start-up of the slurry-forming steps, non-uniform slurry was passed thru lines 26 and 30 and 60 into tank 56 for use later by the same or similar procedure to that applied in using stored slurry from tank 54.

In the embodiment of the invention illustrated in the drawing, tanks 54 and 56 have a capacity of about 10,000 gallons each so that slurry can be saved from several start-ups and shutdowns. However, smaller capacity slurry storage tanks may be used, requiring more frequent use of the slurry return or recycle system.

In some runs, extender oil was introduced to mixer 36 as an oil-water emulsion for inclusion in the carbex. In one instance, using the approximate feed rates set forth above, an emulsion of 50/50 by weight oil-water composition was fed at the rate of 612 gal./hr. into mixer 36 thru a separate feed line (not shown).

The particular composition of the various streams and the carbex produced are not a part of the invention and those conventional in the art may be used and produced.

Certain modifications of the invention will become apparent to those skilled in the art and the illustrative details disclosed are not to be construed as imposing unnecessary limitations on the invention.

I claim:

1. In a continuous process for preparing latex coagulated with carbon black comprising forming a substantially uniform aqueous slurry of carbon black in a first mixing chamber; pumping said slurry thru a conduit from said first chamber to a second mixing chamber; pumping latex at a uniform rate into said second mixing chamber; forming a mixture of latex and carbon black in said mixing chamber; passing said mixture into a coagulation chamber along with a coagulant to form rubber containing carbon black; and recovering said rubber, wherein periodic shutdown and start-up of said process are necessarily practiced and slurry remaining in said conduit at shutdown is flushed to sewer or other disposal, the improvement comprising the steps of:

(1) passing the slurry in said conduit at shutdown thru a second conduit to a slurry tank;

(2) when start-up is to be effected, providing initial slurry for said second mixing chamber at a predetermined rate by the steps of:

(a) determining the concentration of carbon black in the slurry in said slurry tank;

(b) pumping slurry from said slurry tank to a calibration tank;

(c) pumping slurry from said calibration tank from an upper fixed level to a lower fixed level therein to said slurry tank thru a flow rate controller and timing the flow between said levels to provide means of calculating flow rate of carbon black;

(d) calibrating said flow rate controller in accordance with (c); and (e) pumping slurry from said slurry tank to said second mixing chamber thru said flow rate controller to control the rate of feeding carbon black to said second mixer.

2. In the process of claim 1, the additional steps of:

(3) forming carbon black slurry in said first mixing chamber during step (2)(e);

(4) pumping the last formed slurry into a second slurry tank at least until the concentration of carbon black in said last formed slurry is uniform; and (5) thereafter, discontinuing flow from first said slurry tank to said second mixing chamber and pumping said last formed slurry directly into said second mixing chamber.

3. In a continuous process for preparing latex coagulated with carbon black comprising forming a substantially uniform aqueous slurry of carbon black in a first mixing chamber; pumping said slurry thru a conduit from said first chamber to a second mixing chamber; pumping latex at a uniform rate into said second mixing chamber; forming a mixture of latex and carbon black in said second mixing chamber; passing said mixture into a coagulation chamber along with a coagulant to form rubber containing carbon black; and recovering said rubber, wherein periodic shutdown and start-up of said process are necessarily practiced and slurry remaining in said conduit at shutdown is flushed to sewer or other disposal, the improvement comprising the steps of:

(1) passing the slurry in said conduit at shutdown thru a second conduit to a slurry tank;

(2) when start-up is to be effected, providing initial slurry for said second mixing chamber at a predetermined rate by the steps of:

(a) determining the concentration of carbon black in the slurry in said slurry tank;

(b) pumping slurry from said slurry tank to a calibration tank;

(c) pumping a known volume of slurry from said calibration tank thru a flow rate controller back to said slurry tank and timing the rate of flow of said slurry to calibrate said controller; and (d) pumping slurry from said slurry tank thru said flow rate controller into said second mixing chamber to provide a known rate of flow of slurry and carbon black.

4. Apparatus comprising, in combination:

(1) mixing means for forming a uniform slurry of water and particulate carbon black;

(2) a latex-carbon black mixing chamber having a latex inlet and a slurry inlet;

(3) a first valved conduit connecting the means (1) with chamber (2) having pumping means therein;

(4) a latex coagulation chamber connected by conduit means with chamber (2);

(5) a slurry tank for storing slurry;

(6) a second valved conduit connecting tank (5) with conduit (3) upstream of the valve therein;

(7) a calibration vessel having upper and lower fixed levels representing a known volume of slurry;

(8) means for sensing liquid at the levels of vessel (7) and timing the interval between sensed levels;

(9) valved fill conduit means connecting vessel (7) with a lower section of the tank (5) having pumping means therein for filling said vessel with slurry from said tank;

(10) valved drain conduit means connecting a lower section of said vessel with said tank having pumping means therein;

(11) valved conduit means connecting mixing chamber (2) with drain conduit means (10) having flow control means therein; and

(12) valved conduit means connecting conduit means (11), downstream of the flow control means therein, with tank (5).

5. Apparatus comprising, in combination:

(1) mixing means for forming a uniform slurry of water and particulate carbon black;

(2) a latex-carbon black mixing chamber having a latex inlet and a slurry inlet;

(3) a first valved conduit connecting the means (1) with chamber (2) having pumping means therein;

(4) a latex coagulation chamber connected by conduit means with chamber (2);

(5) a slurry tank for storing slurry;

(6) a second valved conduit connecting tank (5) with conduit (3) upstream of the valve therein;

(7) a calibration vessel having upper and lower fixed levels representing a known volume of slurry;

(8) means for sensing liquid at the levels of vessel (7) and timing the interval between sensed levels;

(9) a third conduit connecting the lower section of tank (5) with the lower section of vessel (7), including a valve near each end thereof;

(10) a fourth conduit connecting at one end with said third conduit intermediate the valves of (9) and at the other end with said third conduit intermediate said vessel and the adjacent valve in said third conduit, including pumping means in said fourth conduit and a valve therein downstream of said pumping means;

(11) a fifth conduit connecting at one end with the fourth conduit (10) intermediate the pump means and valve therein and at the other end with tank (2), having a flow control means and a valve downstream thereof;

(12) a sixth conduit connecting at one end with the fifth conduit (11) intermediate the valve and flow control means therein, and at the other end with the tank (5), including a valve in said sixth conduit.

6. The apparatus of claim 5 including:

(13) a second slurry tank connected by separate valved conduits with the conduits (6), (9), and (12).

7. A process for preparing latex coagulated with carbon black which comprises the steps of:

(1) mixing in a first mixing zone carbon black and water to form an effluent slurry of initially varying but later substantially uniform carbon black concentration;

(2) until said concentration is substantially uniform, passing the effluent slurry of (1) to a first storage tank;

(3) when said concentration is substantially uniform, passing said slurry to a second mixing zone;

(4) passing latex at a substantially constant rate (coordinated with the flow rate of black) to the second mixing zone of (3) and mixing same with the slurry fed thereto;

(5) passing latex-carbon black mixture from the second mixing zone of (3) to a coagulation zone;

(6) coagulating the mixture of (5) to form latex containing carbon black;

(7) shutting down the process steps (1) thru (6) and flushing residual slurry between the first and second mixing zones into the storage tank of (2);

(8) starting up the process of steps (1) thru (6) by the steps of:

(a) ascertaining the concentration of carbon black in the tank of (2);

(b) pumping slurry from the storage tank of (2) to a calibration vessel;
(c) pumping a known volume of slurry from the vessel of (b) thru a flow rate controller back to the storage tank of (2) to calibrate said controller;
(d) thereafter, pumping slurry from the tank of (2) thru said controller at known rate into the second mixing zone of (3);
(e) simultaneously resuming steps (4), (5), and (6);

(f) while step (d) is being performed, resuming steps (1), (2), using a second storage tank; and
(g) terminating step (d) and resuming step (3).

References Cited

UNITED STATES PATENTS

| | | | |
|---|---|---|---|
| 3,035,006 | 5/1962 | Hanmer et al. | 260—41.5 |
| 3,055,856 | 9/1962 | Sutherland | 260—41.5 |
| 3,092,603 | 6/1963 | Gauslaa et al. | 260—41.5 |

MORRIS LIEBMAN, *Primary Examiner.*

L. T. JACOBS, *Assistant Examiner.*